(12) United States Patent
Sumner et al.

(10) Patent No.: US 12,169,697 B2
(45) Date of Patent: Dec. 17, 2024

(54) METHODS AND SYSTEMS FOR EXPERT-NOVICE GUIDANCE

(71) Applicant: Toyota Research Institute, Inc., Los Altos, CA (US)

(72) Inventors: Emily Sumner, Berkeley, CA (US); Nikos Arechiga, San Mateo, CA (US); Yue Weng, San Mateo, CA (US); Shabnam Hakimi, Chapel Hill, NC (US); Jonathan A. DeCastro, Arlington, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 487 days.

(21) Appl. No.: 17/474,652

(22) Filed: Sep. 14, 2021

(65) Prior Publication Data

US 2023/0083838 A1 Mar. 16, 2023

(51) Int. Cl.
*G06F 17/00* (2019.01)
*G06F 16/332* (2019.01)
(Continued)

(52) U.S. Cl.
CPC .......... *G06F 40/40* (2020.01); *G06F 16/3322* (2019.01); *G06F 40/284* (2020.01); *G06N 5/04* (2013.01); *G06F 16/33* (2019.01)

(58) Field of Classification Search
CPC .. G06F 40/30; G06F 16/3329; G06F 16/3344; G06F 40/216; G06F 40/40; G06F 40/284; G06F 40/237; G06F 16/9536; G06F 16/906; G06F 16/55; G06F 16/3334; G06F 40/00; G06F 16/338; G06F 16/355; G06F 16/334; G06F 16/90335; G06F 16/9532; G06F 16/245; G06F 16/33; G06F 16/332; G06F 16/3322; G06F 16/3325; G06F 16/3326; G06F 40/20; G06F 18/20;
(Continued)

(56) References Cited

U.S. PATENT DOCUMENTS 5,724,262 A 3/1998 Ghahramani
6,067,537 A 5/2000 O'Connor et al.
(Continued)

FOREIGN PATENT DOCUMENTS

CN 112606781 A 4/2021

*Primary Examiner* — Michael Ortiz-Sanchez
(74) *Attorney, Agent, or Firm* — Dinsmore & Shohl LLP (57) ABSTRACT

In accordance with one embodiment, a system includes a processor, a memory module communicatively coupled to the processor, an NLP module communicatively coupled to the processor, and a set of machine-readable instructions stored in the memory module. The machine-readable instructions, when executed by the processor, direct the processor to perform operations including receiving a text data, and receiving a training text data for training one or more models of the NLP module. The operations also include generating, with a novice model of the NLP module, a novice suggestion based on the text data and the training text data to present an idea related to the text data, generating, with an expert model of the NLP module, an expert suggestion based on the text data and the training text data to present an idea elaborating on the text data, and outputting the novice suggestion and/or the expert suggestion.

17 Claims, 6 Drawing Sheets

(51) Int. Cl.
*G06F 40/284* (2020.01)
*G06F 40/40* (2020.01)
*G06N 5/04* (2023.01)
*G06F 16/33* (2019.01)

(58) Field of Classification Search
CPC .. G06F 16/3338; G06F 16/5846; G06F 16/24; G06F 16/53; G06F 16/3331; G06F 18/24; G06F 2218/12; G06F 18/23; G06F 18/2431; G06F 16/9538; G06F 40/44; G06F 16/00; G06F 40/56; G06F 16/953; G06F 16/90332; G06F 16/903; G06F 16/248; G06F 16/9038; G06N 5/04; G06N 5/01; G06N 5/00; G06N 5/02
See application file for complete search history.

(56) References Cited

U.S. PATENT DOCUMENTS

| | | | |
|---|---|---|---|
| 7,024,636 B2 | 4/2006 | Weed | |
| 7,620,565 B2 | 11/2009 | Abelow | |
| 11,921,768 B1 * | 3/2024 | Ganesh | G06N 3/02 |
| 2013/0218914 A1 | 8/2013 | Stavrianou et al. | |
| 2020/0258506 A1 * | 8/2020 | Slifka | G06F 40/295 |
| 2021/0192134 A1 * | 6/2021 | Yue | G06F 16/3326 |
| 2022/0245349 A1 * | 8/2022 | Pentyala | G06F 40/216 |
| 2022/0318230 A1 * | 10/2022 | Sikka | G06F 40/166 |
| 2022/0318504 A1 * | 10/2022 | Malkiel | G06F 16/9538 |
| 2022/0414331 A1 * | 12/2022 | Asthana | G06N 3/044 |
| 2023/0034011 A1 * | 2/2023 | Sarkar | G06F 40/30 |
| 2023/0353530 A1 * | 11/2023 | Schmid | G06F 40/30 |

* cited by examiner

METHODS AND SYSTEMS FOR EXPERT-NOVICE GUIDANCE

TECHNICAL FIELD

The present disclosure relates to natural language processing, and more particularly to implementations of natural language processing that guide a user's thought process.

BACKGROUND

There is a tradeoff between designing like a novice and designing like an expert. For example, a novice has more creativity and will likely create more unique products. The creativity may derive from a novice finding similar topics and applying knowledge from the similar topics to the issue at hand. The knowledge from the similar topics may be different from knowledge traditionally applied to the issue at hand by those with experience, and thus may lead to more unique solutions for the issue. However, drawbacks to a novice's perspective may include the perspectives being less goal-oriented and less technically correct. Because a novice is not as familiar with the issue, the novice may have more abstract or amorphous objectives with regard to addressing the issue. The novice may also identify possible solutions that are not ideal for the particular issue.

On the other hand, experts know more about the primary stakeholders and have strong knowledge about what was successful in the past. The expert is aware of the positives and negatives of potential solutions and the requirements of whom the expert is designing for. The expert may also stick to a methodology that has proven itself in the past. However, this type of rigid thinking might make it more difficult to be open to new ideas, which may limit creativity. The expert may get stuck in a particular process and become blinded to new methods that may improve problem solving.

Therefore, alternative strategies for identifying novice and expert perspectives that can inspire the creativity of the novice perspective and the practicality of the expert perspective are desired.

SUMMARY

In accordance with one embodiment of the present disclosure, a system includes a processor, a memory module communicatively coupled to the processor, a natural language processing (NLP) module communicatively coupled to the processor, and a set of machine-readable instructions stored in the memory module. The machine-readable instructions, when executed by the processor, direct the processor to perform operations including receiving a text data, and receiving a training text data for training one or more models of the NLP module. The operations also include generating, with a novice model of the NLP module, a novice suggestion based on the text data and the training text data to present an idea related to the text data, generating, with an expert model of the NLP module, an expert suggestion based on the text data and the training text data to present an idea elaborating on the text data, and outputting the novice suggestion and/or the expert suggestion.

In accordance with another embodiment of the present disclosure, a method includes receiving a text data, and receiving a training text data for training one or more models of the NLP module. The method also includes generating, with a novice model of the NLP module, a novice suggestion based on the text data and the training text data to present an idea related to the text data, generating, with an expert model of the NLP module, an expert suggestion based on the text data and the training text data to present an idea elaborating on the text data, and outputting the novice suggestion and/or the expert suggestion.

In accordance with yet another embodiment of the present disclosure, a non-transitory machine-readable medium having instructions that, when executed by a processor, direct the processor to perform operations including receiving a text data, and receiving a training text data for training one or more models of the NLP module. The operations also include generating, with a novice model of the NLP module, a novice suggestion based on the text data and the training text data to present an idea related to the text data, generating, with an expert model of the NLP module, an expert suggestion based on the text data and the training text data to present an idea elaborating on the text data, and outputting the novice suggestion and/or the expert suggestion.

Although the concepts of the present disclosure are described herein with primary reference to product design, it is contemplated that the concepts will enjoy applicability to any document drafting. For example, and not by way of limitation, it is contemplated that the concepts of the present disclosure will enjoy applicability to drafting scholarly articles.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods, systems, and non-transitory computer-readable mediums having instructions for generating novice-expert guidance. In embodiments disclosed herein, a system for generating novice-expert guidance may be a server. The server may receive a text data from a user. The server may also receive a training text data for training one or more models of the natural language processing (NLP) module. With the NLP module, the server may generate a novice suggestion and an expert suggestion, representing the novice-expert guidance. The server may then output the novice-expert guidance.

To generate the novice-expert guidance, the NLP module is configured to perform a set of NLP techniques for generating novice suggestions and a set of NLP techniques for generating expert suggestions. The novice model of the NLP module contains NLP techniques for generating novice suggestions. The novice model may encode the text data, or a subset thereof, into a numerical format, such as a vector. The novice model may also encode a training text data, or a subset thereof, into the same numerical format. To arrive at a similar idea from the text data, as a novice would, the novice model transforms the encoded text data by a predetermined amount and decodes the text data from the transformed the encoded text data.

The expert model of the NLP module contains NLP techniques for generating expert suggestions. The expert model may be a predictive text generation model that is primed with the text data to predict one or more sentences. Additionally or alternatively, the expert model may extract keywords from the text data and determine a topic based on the keywords. Based on the determined topic, the server may identify a reference document from a database of reference documents. The server may then extract reference text data from the reference document based on the keywords to generate the expert suggestion Referring now to FIG. 1, an example system 100 for generating expert-novice guidance is schematically depicted. The system 100 may comprise a server 102 and a user computer 126. The server 102 may include a processor 106, memory 108, NLP module 112, input/output (I/O) interface 110, and network interface 122. The server 102 may also include a communication path 104 that communicatively couples the various components of the server 102. The server 102 may be a physical server, a virtual machine existing on a server, a program operating on a server, or a component of a server. The server 102 may be configured to generate expert-novice guidance and carry out the methods as described herein. In some embodiments, the user computer 126 may also or instead be configured to generate expert-novice guidance and carry out the methods as described herein.

Figure 1:
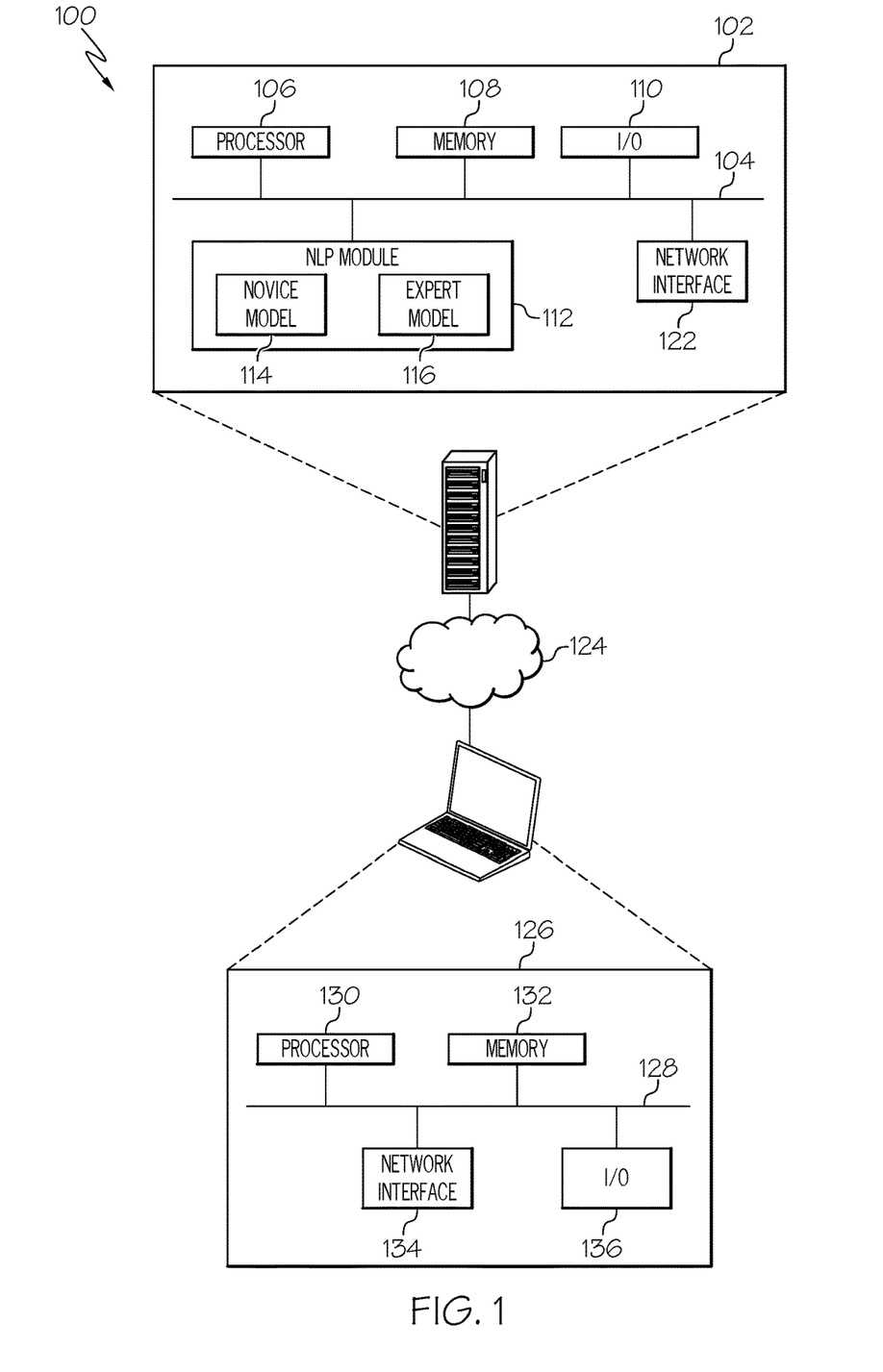
FIG. 1 depicts an example system for generating expert-novice guidance, according to one or more embodiments shown and described herein.

The processor 106 may include one or more processors that may be any device capable of executing machine-readable and executable instructions. Accordingly, each of the one or more processors of the processor 106 may be a controller, an integrated circuit, a microchip, or any other computing device. The processor 106 is coupled to the communication path 104 that provides signal connectivity between the various components of the server 102. Accordingly, the communication path 104 may communicatively couple any number of processors of the processor 106 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

The communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth®, Near-Field Communication (NFC), and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 108 is coupled to the communication path 104 and may contain one or more memory modules comprising RAM, ROM, flash memories, hard drives, or any device capable of storing machine-readable and executable instructions such that the machine-readable and executable instructions can be accessed by the processor 106. The machine-readable and executable instructions may comprise logic or algorithms written in any programming language of any generation (e.g., 1GL, 2GL, 3GL, 4GL, or 5GL) such as, e.g., machine language, that may be directly executed by the processor 106, or assembly language, object-oriented languages, scripting languages, microcode, and the like, that may be compiled or assembled into machine-readable and executable instructions and stored on the memory 108. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any computer programming language, as pre-programmed hardware elements, or as a combination of hardware and software components.

The input/output interface, or I/O interface 110, is coupled to the communication path 104 and may contain hardware and software for receiving input and/or providing output. Hardware for receiving input may include devices that send information to the server 102. For example, a keyboard, mouse, scanner, and camera are all I/O devices because they provide input to the server 102. Software for receiving inputs may include an on-screen keyboard and a touchscreen. Hardware for providing output may include devices from which data is sent. For example, a monitor, speaker, and printer are all I/O devices because they output data from the server 102.

The NLP module 112 is coupled to the communication path 104 and may contain one or more models for processing text data. The NLP module 112 may store text data received from the user computer 126. The NLP module 112 also includes machine-readable instructions for the one or more models for processing the text data. The NLP module 112 may contain a novice model 114 and an expert model 116. The NLP module 112 may also contain instructions for preprocessing text data for analysis, such as removing stop words, stemming, lemmatization, and the like. In some embodiments, the NLP module 112 may be included and/or stored in the memory 108. In some embodiments, the functions of the NLP module 112 may be performed by a device remote from the server 102.

The novice model 114 contains machine-readable instructions for generating novice suggestions that are related to the text data. To generate a novice suggestion, the novice model 114 may receive a text data and a training text data. The text data may be text input by a user, such as text entered on a keyboard via I/O interface 110. The training text data may be pre-existing libraries of text data that may be used to train a neural network for natural language processing, such as Wikipedia or Google News. The novice model 114 may then encode the training text data and the text data into a numerical format, a process known in the art as "word embedding." The novice model 114 may use any available encoding techniques to extract the word embeddings from the text data and the training text data. Such techniques include GloVe, TF-IDF, word2vec, and any other known word embedding algorithm. The resulting numerical format may be a real-valued vector, for example, where words that are closer in vector space are similar in meaning. The novice model 114 may then transform the encoded text data. The transformation may include modifying a magnitude and/or a direction of the encoded text data. The amount of modification may be predetermined based on how similar to the text data the idea to be generated should be. After transforming, the novice model 114 may identify one or more components of the encoded training text data that is nearest to the transformed encoded text data. Nearness may be determined based on known similarity algorithms, such as cosine similarity, Euclidean distance, Jaccard distance, word mover's distance, and the like. For example, nearness may be determined based on the proximity of the word embeddings in vector space. Once an encoded training text data nearest to the transformed encoded text data has been identified, the novice model 114 may decode the identified encoded training text data to generate a novice suggestion. In some embodiments, the text data and/or the training text data may first be preprocessed, which may include performing stop word removal, stemming, lemmatization, and the like.

The expert model 116 contains machine-readable instructions for generating expert suggestions that elaborate on the text data. To generate an expert suggestion, the expert model 116 may receive a text data. The text data may be text input by a user, such as text entered on a keyboard via I/O interface 110. The expert model 116 may use supervised machine learning techniques to train a neural network to receive an input and generate an output, where the input may include the text data and the output may be one or more sentences based on the text data. An example neural network includes, but is not limited to, OpenAI® GPT-3 and BERT. In some embodiments, the input to the expert model 116 may be the text data, thus priming the expert model 116 for predicting one or more sentences based on the text data. The predictions output from the expert model may be the expert suggestion.

In other embodiments, the input to the expert model 116 may be one or more keywords from the text data, and the expert model 116 may add words around the keyword to build new sentences and generate the expert suggestion. Extracting keywords may utilize supervised methods that train a machine learning model based on labeled training sets and uses the trained model to determine whether a word is a keyword, wherein the machine learning model is a decision tree, a Bayes classifier, a support vector machine, a convolutional neural network, and the like. Extracting keywords may also or instead utilize unsupervised methods that rely on linguistic-based, topic-based, statistics-based, and/or graph-based features of the text data such as text-frequency inverse-document-frequency (TF-IDF), KP-miner, TextRank, Latent Dirichlet Allocation (LDA), and the like.

In another embodiment for generating an expert suggestion, the expert model 116 may first determine a topic of the text data. The expert model 116 may use machine learning techniques to extract the main topics, as represented by keywords, that occur in a text data. For example, LDA is a type of topic model that may be used to classify words in a text data to identify a particular topic of the text data. Based on the determined topic, the expert model 116 may identify and retrieve one or more reference documents. For example, the expert model 116 may query a database of documents for documents that discuss the determined topic. The expert model 116 may then extract reference text data from the reference document based on the keyword to generate the expert suggestion, wherein the expert suggestion elaborates on the text data by presenting more information from sources (i.e., reference documents) that discuss the topic of the text data. In some embodiments, the reference documents may be included in the training text data. It should be understood that embodiments of the present disclosure may use a greater or fewer number of models without departing from the scope of the present disclosure.

The network interface 122 includes network connectivity hardware for communicatively coupling the server 102 to the network 124. The network interface 122 can be communicatively coupled to the communication path 104 and can be any device capable of transmitting and/or receiving data via a network 124 or other communication mechanisms. Accordingly, the network interface 122 can include a communication transceiver for sending and/or receiving any wired or wireless communication. For example, the network connectivity hardware of the network interface 122 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The server 102 may be communicatively coupled to the user computer 126 by a network 124. The network 124 may be a wide area network, a local area network, a personal area network, a cellular network, a satellite network, and the like.

The user computer 126 may generally include a processor 130, memory 132, network interface 134, I/O interface 136, and communication path 128. Each user computer 126 component is similar in structure and function to its server 102 counterparts, described in detail above. The user computer 126 may be communicatively connected to the server 102 via network 124. Multiple user computers may be communicatively connected to one or more servers via network 124.

Figure 2:
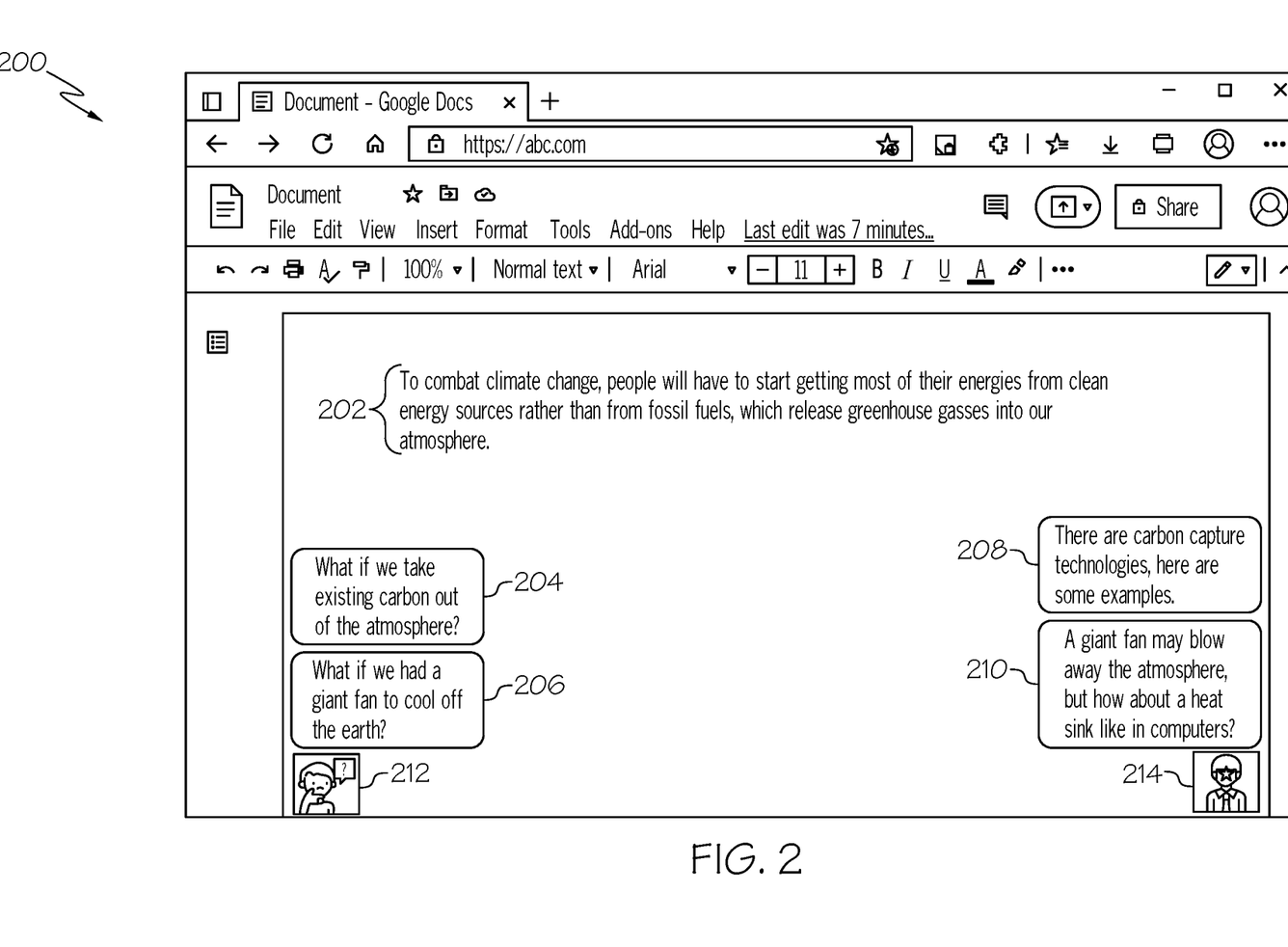
FIG. 2 depicts an example user interface for receiving text data and presenting novice suggestions and expert suggestions, according to one or more embodiments shown and described herein.

Referring now to FIG. 2, an example user interface 200 for receiving text data 202 and presenting novice suggestions 204, 206 and expert suggestions 208, 210 is depicted. The user interface 200 may be generated by the user computer 126. The user interface 200 may be presented to a user on the user computer 126 via the I/O interface 136. For example, the user interface 200 may be presented to the user via an electronic display connected to the user computer 126 via the I/O interface 136. The user interface 200 may include a text input area wherein text data 202 is input by a user via the I/O interface 136 with an input device, such as a keyboard. As text data 202 is being input, and/or after text input has been completed, the user interface 200 may send the text data 202 to the server 102 via the network 124. The server 102 may use the text data 202 to generate a novice suggestion 204, 206 and/or an expert suggestion 208, 210 by using methods as described herein.

After the server 102 has generated the novice suggestion 204, 206 and/or the expert suggestion 208, 210, the server 102 may output the suggestions 204, 206, 208, 210 by sending them to the user computer 126. The suggestions 204, 206, 208, 210 may be presented to the user on the user computer 126 via the I/O interface 136. For example, the suggestions 204, 206, 208, 210 may be presented to the user via an electronic display connected to the user computer 126 via the I/O interface 136. The user interface 200 may have a novice icon 212 indicating the location of novice suggestions 204, 206. The novice icon 212 may be clickable to hide and reveal novice suggestions in the user interface 200. The user interface 200 may also have an expert icon 214 indicating the location of expert suggestions 208, 210. The expert icon 214 may also be clickable to hide and reveal expert suggestions in the user interface 200. The appearance and location of the novice icon 212, novice suggestions 204, 206, expert icon 214, and expert suggestions 208, 210 are not limited to those shown in FIG. 2. In some embodiments, the text data 202 may not be sent to the server 102, and the user computer 126 may generate and output the suggestions 204, 206, 208, 210 onto the user interface 200.

Figure 3:
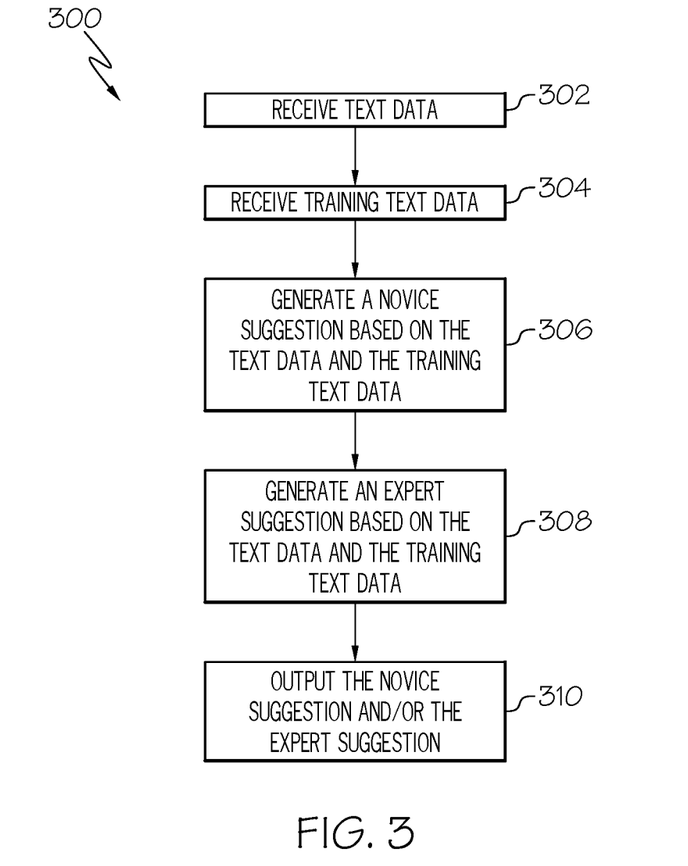
FIG. 3 depicts an example method for generating expert-novice guidance, according to one or more embodiments shown and described herein.

Referring now to FIG. 3, an example method 300 for generating expert-novice guidance is depicted. In step 302, the server 102 may receive a text data 202. A user may enter a text data 202 into a user interface 200 via I/O interface 136 of the user computer 126. The text data may be sent to the server 102 via a network 124 from the user computer 126. The text data 202 may be in any electronic format. The text data 202 may be regarding a product design, where creativity is necessary yet so is technical knowledge. However, the text data 202 is not limited specifically to product design and may be any other text data.

In step 304, the server 102 may receive training text data. The training text data may be data from existing text data sources. For example, training text data may come from Wikipedia, news outlets, encyclopedias, scholarly journals, and any other database of text data. The training text data may be general or domain specific (i.e., specific to a particular topic). The training text data may be in any electronic format. The training text data may be used to train models, such as neural networks. In some embodiments, the models may be pre-trained, in which case step 304 is performed inherently by use of pre-trained models. For example, GPT-3 is a model that uses neural networks pre-trained on datasets including Common Crawl, WebText2, Books1, Books2, and Wikipedia.

In step 306, the server 102 generates one or more novice suggestions based on the text data 202 and the training text data to present an idea related to the text data 202. The goal of the novice suggestion is to push the user to be more creative by bringing up suggestions that are related yet outside of the realm of the user's current thinking, as indicated by the user's text data 202. The server 102 may be equipped with an NLP module 112 having a novice model 114. The novice model 114 may be configured to generate a novice suggestion according to methods as described herein and depicted in FIGS. 4A and 4B. In short, the novice model 114 encodes the user's text data 202 input into the model's latent space and then transforms the encoding in a random direction. The degree to which the encoding is transformed may be a setting that the user may set to make the novice model 114 more or less creative in its suggestions. From there, a suggestion may be identified and decoded for presentation to the user. In some embodiments, the text data may be the expert suggestion generated in step 308.

In step 308, the server 102 generates one or more expert suggestions based on the text data 202 and the training text data to present an idea elaborating on the text data 202. The goal of the expert suggestion is to guide the user along the user's current line of thinking to expand the user's current thought process, as indicated by the user's text data 202. The server 102 may be equipped with an NLP module 112 having an expert model 116. The expert model 116 may be configured to generate an expert suggestion according to methods as described herein and depicted in FIGS. 5A and 5B. In short, rather than encoding the text, the expert model is primed with the text data 202 to predict/generate one or more sentences based on the text data 202 and training text data, where the predicted/generated sentences are the expert suggestion. In some embodiments, the text data may be a novice suggestion generated in step 306.

In step 310, the server 102 outputs the novice suggestion and/or the expert suggestion. After the server 102 has generated the novice suggestion and/or the expert suggestion, the server 102 may output the suggestions by sending them to the user computer 126. The user computer 126 may then present the suggestions to the user by rendering them onto an electronic display connected to the user computer 126 by I/O interface 136. The suggestions may be rendered onto a user interface 200 where the user input the text data 202.

In some embodiments, each of the foregoing steps may also or instead be performed on the user computer 126. For example, the steps of method 300 may be in the form of a standalone application, a web browser plug-in, or the like stored in the memory 132 of the user computer 126.

Figure 4A:
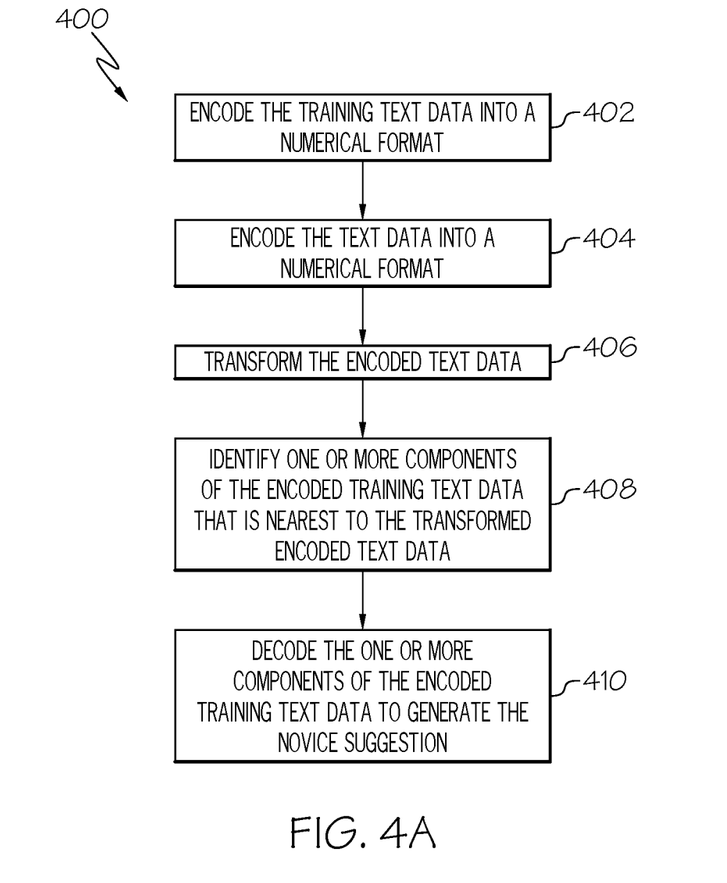
FIG. 4A depicts an example method for generating novice suggestions, according to one or more embodiments shown and described herein.

Referring now to FIG. 4A, an example method 400 for generating novice suggestions is depicted. In step 402, the novice model 114 encodes the training text data into a numerical format by word embedding. The novice model 114 may use any available encoding techniques to extract the word embeddings from the text data and the training text data. Such pre-trained embedding techniques include GloVe, TF-IDF, word2vec, and any other known word embedding algorithm. In some embodiments, the word embeddings may be trained on a neural network using a large text corpus, such as the training text data. The resulting numerical format may be a real-valued vector, for example, where words that are closer in vector space are similar in meaning.

In step 404, the novice model 114 encodes the text data 202 into a numerical format by the same or similar method as step 402.

Figure 4B:
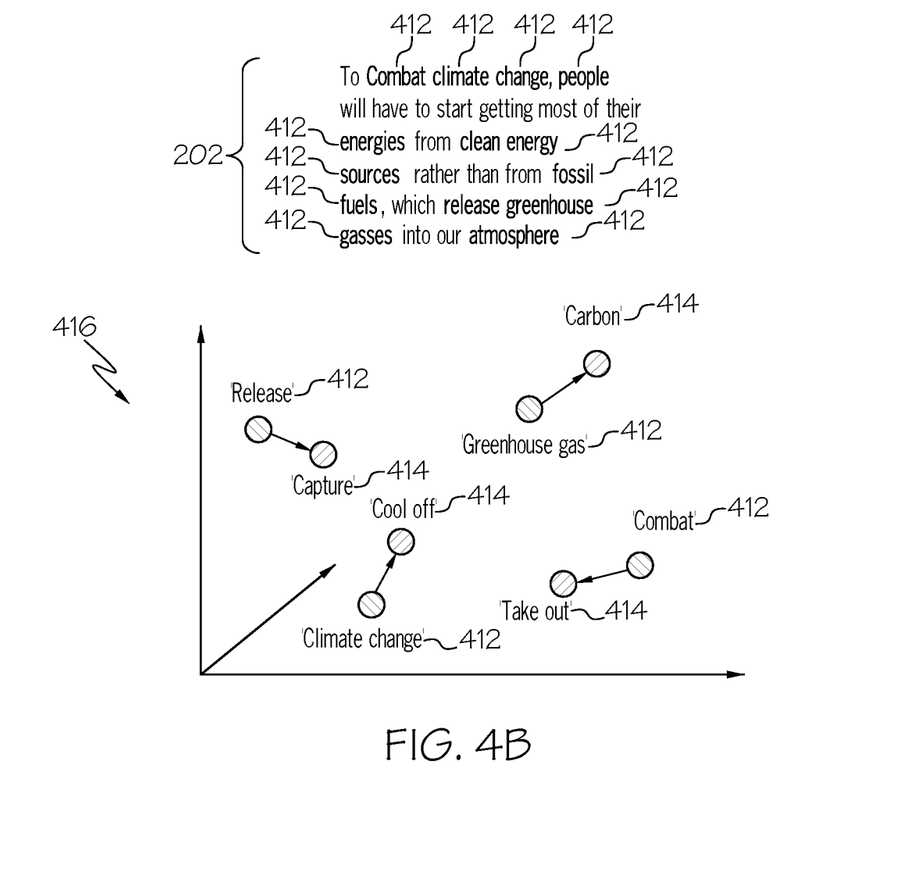
FIG. 4B depicts a graphical depiction of an example method for generating novice suggestions, according to one or more embodiments shown and described herein.

In step 406, the novice model 114 transforms the encoded text data by modifying a magnitude and/or a direction of the encoded text data by a predetermined amount. The amount of modification may be predetermined based on how similar to the text data the idea to be generated should be. Modifying the encoded text data to a greater degree may result in a novice suggestion that is less related to the text data than modifying the encoded text data to a lesser degree. In some embodiments, the type of modification may be based on the similarity function used in step 408. For example, if the similarity function is cosine similarity, then the modification may be the direction of the encoded text data. If the similarity function is word mover's distance, then the modification may be a position of each word in the vector space, as shown in FIG. 4B.

In step 408, the novice model 114 identifies one or more components of the encoded training text data that is nearest to the transformed encoded text data. Nearness may be determined based on known similarity functions, such as cosine similarity, Euclidean distance, Jaccard distance, word mover's distance, and the like. For example, nearness may be determined based on the proximity of the word embeddings in the vector space. Components of the encoded training text data may be words, sentences, or any other text fragment from the training text data.

In step 410, the novice model 114 decodes the one or more components of the encoded training text data to generate the novice suggestion. The identified components of the encoded training text data may be decoded by inversing the word embedding back to the corresponding training text data. This may be done, for example, by maintaining a table of components of training text data (e.g., words, sentences, paragraphs, and the like) and their corresponding word embeddings. This may also be done, for example, by performing the inverse of the word embedding function on the identified vector.

In some embodiments, the text data and/or the training text data may be preprocessed prior to method 400, which may include performing stop word removal, stemming, lemmatization, and the like.

Referring now to FIG. 4B, a graphical depiction of an example method 400 for generating novice suggestions is depicted. First, the text data 202 may be preprocessed. The preprocessing may include changing the case to a uniform case (e.g., lower case), removing stop words (e.g., "to" and "of"), removing punctuation (e.g., "," and "."), stemming (e.g., "energies" to "energy" and "sources" to "source"), and any other textual preprocessing known in the art.

To make the method 400 perform more efficiently on larger bodies of text data, keywords 412 of the text data 202 may be identified and the method 400 performed therefrom. Keywords 412 (including words, bigrams, trigrams, and other n-grams) may be identified by supervised methods that train a machine learning model based on labeled training sets and uses the trained model to determine whether a word is a keyword, wherein the machine learning model is a decision tree, a Bayes classifier, a support vector machine, a convolutional neural network, and the like. The novice model 114 may also or instead utilize unsupervised methods that rely on linguistic-based, topic-based, statistics-based, and/or graph-based features of the text data such as TF-IDF, KP-miner, TextRank, LDA, and the like.

The novice model 114 encodes the text data 202 into a numerical format by word embedding as described above. In the scenario as depicted in FIG. 4B, the text data 202 encoded is only the identified keywords 412 to streamline the method 400. The keywords 412 are each encoded and plotted on a graph 416 according to their encoding. Words from the training text data 414 may be plotted as well. It should be understood that plotting on the graph 416 is for the purpose of demonstration and is not necessary for performing the method 400.

After the text data 202 and the training text data 414 are plotted, text data 202 may be transformed by modifying a magnitude and/or a direction of the encoded text data by a predetermined amount, where the amount may affect how relevant the generated novice suggestions will be. Because the text data 202 are plotted in the graph 416 according to their words, each word embedding may be shifted by one unit in a random direction. It should be noted that this modification is for demonstration purposes and is not limited to the transformation, the unit, or the direction. In other embodiments, if the text data 202 was plotted entirely as a single vector, for example, then the vector may be shifted, rotated, and/or otherwise modified by any degree.

After the embeddings of the text data 202 have been transformed, the training text data 414 nearest to the text data 202 may be identified. When plotted on the graph 416, this may be easy to identify visually. However, the identification may be performed mathematically using, for example, word mover's distance, which uses the word embeddings of the words to measure the minimum distance that the words in the text data need to travel in the graph 416 to reach the words in the training text data 414. In other embodiments, identification may be performed mathematically to find the most similar embeddings of training text data 414 by using cosine similarity, Euclidian distance, or the like. In FIG. 4B, only the training text data 414 nearest to the text data 202 is depicted. Because the training text data 414 in FIG. 4B is nearest to the text data 202, the depicted training text data 414 are the identified components of the encoded training text data.

After the components of the encoded training text data 414 nearest keywords 412 of the encoded text data 202 is identified, the novice model 114 decodes the components of the encoded training text data to generate the novice suggestion. The identified components of the encoded training text data may be decoded by inversing the word embedding back to the corresponding training text data. This may be done, for example, by maintaining a table of components of training text data (e.g., words, sentences, paragraphs, and the like) and their corresponding word embeddings. In this instance, the corresponding training text data may only be keywords, similar to the keywords 412 that were embedded and plotted on the graph 416. To generate a novice recommendation via the identified keywords from the training text data 414, the novice model 114 may use supervised machine learning to train a neural network to receive an input and generate an output, where the input may include a keyword and the output may be a sentence based on the keyword. For example novice model 114 may use OpenAI® GPT-3 to generate a sentence based on the keyword of the training text data 414. In some embodiments, the input to the novice model 114 may be a sentence rather than a keyword, and the novice model 114 may rewrite the sentence into the new sentence or rephrase the sentence into a question.

For example, in FIG. 4B, the text data 202 states, "to combat climate change, people will have to start getting most of their energies from clean energy sources rather than from fossil fuels, which release greenhouse gasses into our atmosphere." Keywords 412 from the text data may include "release," "greenhouse gas," "combat", and "climate change." The keywords 412 plotted on the graph 416 may be transformed by shifting one unit so that "release" is shifted in the +x and −y direction, "greenhouse gas" is shifted in the +x and +y direction, "combat" is shifted in the −x and −y direction, and "climate change" is shifted in the +x and +y direction. The identified training text data 414 may be "capture", "carbon", "take out", and "cool off" due to the proximity of their embeddings to the embeddings of the keywords 412 of text data 202. With the identified training text data 414, one or more novice suggestions may be generated. A text generation model may build a sentence around one or more of the keywords 412 of the text data 202. For instance, "carbon" and "take out" may be used to generate novice suggestion 204, "what if we take existing carbon out of the atmosphere?", and "cool off" may be used to generate novice suggestion 206, "what if we had a giant fan to cool off the earth?". The generated novice suggestions 204, 206 may be provided to a user computer 126 for presentation to the user.

Figure 5A:
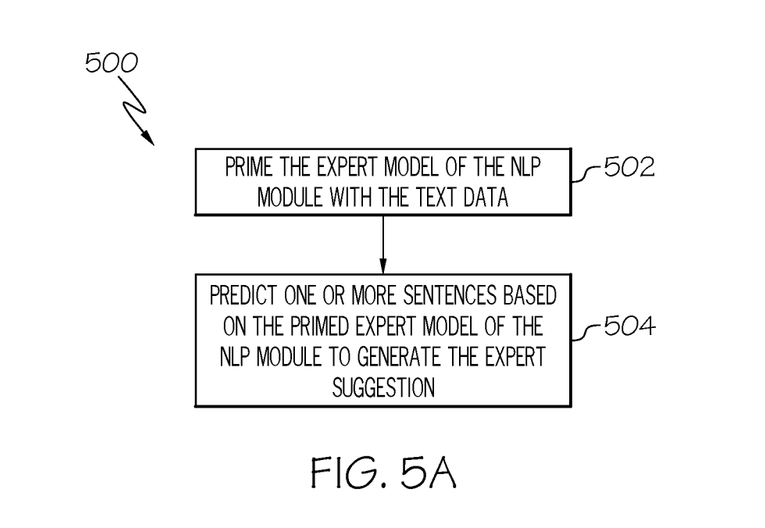
FIG. 5A depicts an example method for generating expert suggestions, according to one or more embodiments shown and described herein.

Referring now to FIG. 5A, an example method 500 for generating expert suggestions is depicted. In step 502, the expert model 116 is primed with the text data 202. The expert model 116 contains machine-readable instructions for generating expert suggestions that elaborate on the text data 202. To generate an expert suggestion, the expert model 116 may receive a text data 202. The expert model 116 may use supervised machine learning techniques to train a neural network to receive an input and generate an output, where the input may include the text data and the output may be one or more sentences based on the text data. An example neural network includes, but is not limited to, OpenAI® GPT-3 and BERT. To prime the expert model 116, the text data 202 is input to the expert model 116. In some embodiments, the expert model 116 may receive one or more novice suggestions as input to generate expert suggestions therefrom so that the expert suggestion may appear to be in conversation with the novice suggestion. For example, if the novice suggestion 206 is "what if we had a giant fan to cool off the earth?" then the expert suggestion 210 may respond "a giant fan may blow away the atmosphere."

In other embodiments, the input to the expert model 116 may be one or more keywords 412 from the text data 202. Extracting keywords may utilize supervised methods that train a machine learning model based on labeled training sets and uses the trained model to determine whether a word is a keyword, wherein the machine learning model is a decision tree, a Bayes classifier, a support vector machine, a convolutional neural network, and the like. Extracting keywords may also or instead utilize unsupervised methods that rely on linguistic-based, topic-based, statistics-based, and/or graph-based features of the text data such as TF-IDF, KP-miner, TextRank, LDA, and the like.

In step 504, the expert model 116 predicts one or more sentences based on the priming text data 202 to generate an expert suggestion. With the text data 202 used as input to prime the expert model 116, the expert model 116 uses a trained neural network (e.g., pre-trained or manually trained based on training text data) to generate one or more sentences based on the text data 202 to elaborate on the text data. If the text data 202 used to prime the expert model 116 was keywords 412 of the text data 202, then the expert model 116 may add words around the keyword to build new sentences thereby generating the expert suggestion.

Figure 5B:
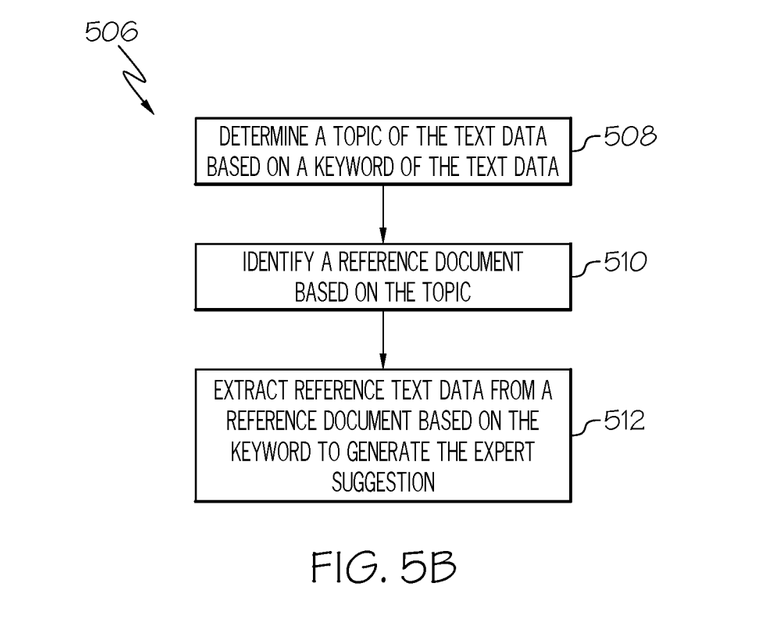
FIG. 5B depicts another example method for generating expert suggestions, according to one or more embodiments shown and described herein.

Referring now to FIG. 5B, another example method 506 for generating expert suggestions is depicted. In step 508, the expert model 116 may determine a topic of the text data 202 based on one or more keywords of the text data. The expert model 116 may first determine a topic of the text data. The expert model 116 may use machine learning techniques to extract the main topics, as represented by keywords, that occur in a text data. For example, LDA is a type of topic model that may be used to classify words in a text data to identify a particular topic of the text data. Example keywords of text data 202 include keywords 412, as shown in FIG. 4B.

Referring still to FIG. 5B, in step 510, the expert model 116 may identify one or more reference documents based on the determined topic. For example, the expert model 116 may query a database of documents for documents that discuss the determined topic. The expert model 116 may then extract reference text data from the reference document based on the keyword to generate the expert suggestion. Reference documents may include Wikipedia, news outlets, encyclopedias, scholarly journals, and any other database of text data. In some embodiments, the reference documents may be comprised of the training text data.

In step 512, the expert model 116 may extract reference text data from the reference document based on the keyword to generate the expert suggestion. The expert model 116 may locate sentences containing the keyword and/or the topic and use the located sentences as an expert suggestion. In some embodiments, the expert model 116 may use NLP techniques to rephrase and/or paraphrase the located sentences. In some embodiments, the expert model 116 may simply cite the located sentences. For example, if the expert model 116 receives novice suggestion 204 and identifies keywords "take out" and "carbon" therefrom, the expert model 116 may retrieve reference documents relating to carbon capture and cite them to the user stating "there are carbon capture technologies, here are some examples . . . " as recited in expert suggestion 208.

It should now be understood that in embodiments disclosed herein, a system for generating novice-expert guidance may receive a text data from a user. The system may also receive a training text data for training one or more models of the NLP module. With the NLP module, the system may generate a novice suggestion and an expert suggestion, representing the novice-expert guidance. The system may then output the novice-expert guidance.

To generate the novice-expert guidance, the NLP module is configured to perform a set of NLP techniques for generating novice suggestions and a set of NLP techniques for generating expert suggestions. The novice model of the NLP module contains NLP techniques for generating novice suggestions. The novice model may encode the text data, or a subset thereof, into a numerical format, such as a vector. The novice model may also encode a training text data, or a subset thereof, into the same numerical format. To arrive at a similar idea from the text data, as a novice would, the novice model transforms the encoded text data by a predetermined amount and decodes the text data from the transformed the encoded text data.

The expert model of the NLP module contains NLP techniques for generating expert suggestions. The expert model may be a predictive text generation model that is primed with the text data to predict one or more sentences. Additionally or alternatively, the expert model may extract keywords from the text data and determine a topic based on the keywords. Based on the determined topic, the system may identify a reference document from a database of reference documents. The system may then extract reference text data from the reference document based on the keywords to generate the expert suggestion.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A system comprises:
   a processor;
   a memory module communicatively coupled to the processor;
   a natural language processing (NLP) module communicatively coupled to the processor;
   a set of machine-readable instructions stored in the memory module that, when executed by the processor, direct the processor to perform operations comprising:
   receiving a text data;
   receiving a training text data for training one or more models of the NLP module;
   generating, with a novice model of the NLP module, a novice suggestion based on the text data and the training text data, the novice suggestion comprising a first idea related to the text data;
   generating, with an expert model of the NLP module, an expert suggestion based on the text data and the training text data, the expert suggestion comprising a second idea elaborating on the text data, the second idea being different from the first idea, wherein generating the expert suggestion comprises:
   determining, with the expert model of the NLP module, a topic of the text data based on a keyword of the text data;
   identifying, with the expert model of the NLP module, a reference document based on the topic; and
   extracting, with the expert model of the NLP module, reference text data from the reference document based on the keyword to generate the expert suggestion; and
   outputting the novice suggestion and/or the expert suggestion.

2. The system of claim 1, wherein generating the novice suggestion comprises:
   encoding, with the novice model of the NLP module, the training text data into a numerical format;
   encoding, with the novice model of the NLP module, the text data into a numerical format;
   transforming the encoded text data by modifying a magnitude and/or a direction of the encoded text data by a predetermined amount;
   identifying one or more components of the encoded training text data that is nearest to the transformed encoded text data; and
   decoding the one or more components of the encoded training text data to generate the novice suggestion.

3. The system of claim 1, wherein generating the expert suggestion comprises:
   priming the expert model of the NLP module with the text data; and
   predicting one or more sentences based on the primed expert model of the NLP module to generate the expert suggestion.

4. The system of claim 1, wherein the set of machine-readable instructions direct the processor to perform operations further comprising:
   preprocessing the text data by transforming the text data to a uniform case, removing punctuation, tokenizing the text data, lemmatization, or combinations thereof.

5. The system of claim 1, wherein the text data is from a user and the training text data is from a database of text data.

6. The system of claim 1, wherein outputting the novice suggestion and/or the expert suggestion comprises:
   generating a user interface (UI) for presenting the novice suggestion and/or the expert suggestion to a user; and
   providing the UI for output to an electronic display.

7. A method comprising:
   receiving a text data;
   receiving a training text data for training one or more models of the NLP module;
   generating, with a novice model of the NLP module, a novice suggestion based on the text data and the training text data, the novice suggestion comprising a first idea related to the text data;
   generating, with an expert model of the NLP module, an expert suggestion based on the text data and the training text data, the expert suggestion comprising a second idea elaborating on the text data, the second idea being different from the first idea, wherein generating the expert suggestion comprises:
   determining, with the expert model of the NLP module, a topic of the text data based on a keyword of the text data;
   identifying, with the expert model of the NLP module, a reference document based on the topic; and
   extracting, with the expert model of the NLP module, reference text data from the reference document based on the keyword to generate the expert suggestion; and
   outputting the novice suggestion and/or the expert suggestion.

8. The method of claim 7, wherein generating the novice suggestion comprises:
   encoding, with the novice model of the NLP module, the training text data into a numerical format;
   encoding, with the novice model of the NLP module, the text data into a numerical format;
   transforming the encoded text data by modifying a magnitude and/or a direction of the encoded text data by a predetermined amount;
   identifying one or more components of the encoded training text data that is nearest to the transformed encoded text data; and
   decoding the one or more components of the encoded training text data to generate the novice suggestion.

9. The method of claim 7, wherein generating the expert suggestion comprises:
   priming the expert model of the NLP module with the text data; and
   predicting one or more sentences based on the primed expert model of the NLP module to generate the expert suggestion.

10. The method of claim 7, further comprising:
    preprocessing the text data by transforming the text data to a uniform case, removing punctuation, tokenizing the text data, lemmatization, or combinations thereof.

11. The method of claim 7, wherein the text data is from a user and the training text data is from a database of text data.

12. The method of claim 7, wherein outputting the novice suggestion and/or the expert suggestion comprises:
    generating a user interface (UI) for presenting the novice suggestion and/or the expert suggestion to a user; and
    providing the UI for output to an electronic display.

13. A non-transitory machine-readable medium having instructions that, when executed by a processor, direct the processor to perform operations comprising:
    receiving a text data;
    receiving a training text data for training one or more models of the NLP module;
    generating, with a novice model of the NLP module, a novice suggestion based on the text data and the training text data, the novice suggestion comprising a first idea related to the text data;

generating, with an expert model of the NLP module, an expert suggestion based on the text data and the training text data, the expert suggestion comprising a second idea elaborating on the text data, the second idea being different from the first idea, wherein generating the expert suggestion comprises:

determining, with the expert model of the NLP module, a topic of the text data based on a keyword of the text data;

identifying, with the expert model of the NLP module, a reference document based on the topic; and extracting, with the expert model of the NLP module, reference text data from the reference document based on the keyword to generate the expert suggestion; and outputting the novice suggestion and/or the expert suggestion.

14. The non-transitory machine-readable medium of claim 13, wherein generating the novice suggestion comprises:

encoding, with the novice model of the NLP module, the training text data into a numerical format;

encoding, with the novice model of the NLP module, the text data into a numerical format;

transforming the encoded text data by modifying a magnitude and/or a direction of the encoded text data by a predetermined amount;

identifying one or more components of the encoded training text data that is nearest to the transformed encoded text data; and decoding the one or more components of the encoded training text data to generate the novice suggestion.

15. The non-transitory machine-readable medium of claim 13, wherein generating the expert suggestion comprises:

priming the expert model of the NLP module with the text data; and predicting one or more sentences based on the primed expert model of the NLP module to generate the expert suggestion.

16. The non-transitory machine-readable medium of claim 13, wherein the operations further comprise:

preprocessing the text data by transforming the text data to a uniform case, removing punctuation, tokenizing the text data, lemmatization, or combinations thereof.

17. The non-transitory machine-readable medium of claim 13, wherein outputting the novice suggestion and/or the expert suggestion comprises:

generating a user interface (UI) for presenting the novice suggestion and/or the expert suggestion to a user; and providing the UI for output to an electronic display.

* * * * *